United States Patent
Don et al.

(10) Patent No.: US 10,152,498 B2
(45) Date of Patent: Dec. 11, 2018

(54) PROVIDING STORAGE TECHNOLOGY INFORMATION TO IMPROVE DATABASE PERFORMANCE

(71) Applicant: EMC Corporation, Hopkinton, MA (US)

(72) Inventors: Arieh Don, Newton, MA (US); Vinay Rao, Bangalore (IN); Gabi Benhanokh, Tel-Aviv (IL); Yaron Dar, Sudbury, MA (US); Nir Sela, Kochav Yair (IL)

(73) Assignee: EMC CORPORATION, Hopkinton, MA (US)

( * ) Notice: Subject to any disclaimer, the term of this patent is extended or adjusted under 35 U.S.C. 154(b) by 218 days.

(21) Appl. No.: 14/995,532

(22) Filed: Jan. 14, 2016

(65) Prior Publication Data

US 2017/0169063 A1   Jun. 15, 2017

(30) Foreign Application Priority Data

Dec. 11, 2015   (IN) .......................... 6639/CHE/2015

(51) Int. Cl.
| | | |
|---|---|---|
| *G06F 7/00* | (2006.01) | |
| *G07F 17/30* | (2006.01) | |
| *G06F 17/30* | (2006.01) | |
| *G06F 3/06* | (2006.01) | |
| *G06F 11/34* | (2006.01) | |

(52) U.S. Cl.
CPC ...... *G06F 17/30306* (2013.01); *G06F 3/0604* (2013.01); *G06F 3/0683* (2013.01); *G06F 11/3409* (2013.01); *G06F 17/30221* (2013.01)

(58) Field of Classification Search
CPC . G06F 3/0683; G06F 3/0604; G06F 17/30221
See application file for complete search history.

(56) References Cited

U.S. PATENT DOCUMENTS

| | | | |
|---|---|---|---|
| 9,329,804 B2* | 5/2016 | Lassa | G06F 3/0688 |
| 2008/0172539 A1* | 7/2008 | Boss | G06F 3/0605 |
| | | | 711/165 |
| 2011/0238740 A1* | 9/2011 | Yu | H04L 41/0213 |
| | | | 709/203 |
| 2012/0254566 A1 | 10/2012 | Clayton et al. | |
| 2012/0278561 A1 | 11/2012 | Mitsuno et al. | |
| 2013/0103778 A1 | 4/2013 | Hayashi et al. | |
| 2013/0297873 A1* | 11/2013 | Hyde, II | G06F 3/0611 |
| | | | 711/117 |
| 2014/0337576 A1* | 11/2014 | Burton | G06F 3/0689 |
| | | | 711/114 |

(Continued)

OTHER PUBLICATIONS

U.S. Non-Final Office Action dated Jul. 28, 2017 for U.S. Appl. No. 15/014,458; 16 pages.

(Continued)

*Primary Examiner* — Charles E Lu
(74) *Attorney, Agent, or Firm* — Daly, Crowley, Mofford & Durkee, LLP

(57) ABSTRACT

In one aspect, a method includes receiving a read or write command from a requester to read data from or write data to a database, inserting in a status message on a status of the read or write command an identifier to identify technology of storage for the data and providing the status message associated with the read or write command to the requester.

15 Claims, 4 Drawing Sheets

(56) References Cited

U.S. PATENT DOCUMENTS

2017/0131920 A1    5/2017   Oshins et al.

OTHER PUBLICATIONS

U.S. Appl. No. 15/014,458, filed Feb. 3, 2016, Don et al.
Response to U.S. Non-Final Office Action dated Jul. 28, 2017 for U.S. Appl. No. 15/014,458; Response filed on Oct. 25, 2017; 7 pages.
U.S. Non-Final Office Action dated Jan. 9, 2018 for U.S. Appl. No. 15/014,458; 8 pages.
Response to U.S. Non-Final Office Action dated Jan. 9, 2018 for U.S. Appl. No. 15/014,458; Response filed May 9, 2018; 12 pages.
U.S. Final Office Action dated Jul. 12, 2018 for U.S. Appl. No. 15/014,458; 12 pages.
RCE and Response to Final Office Action dated Jul. 12, 2018 for U.S. Appl. No. 15/014,458 filed Sep. 14, 2018; 24 pages.

\* cited by examiner

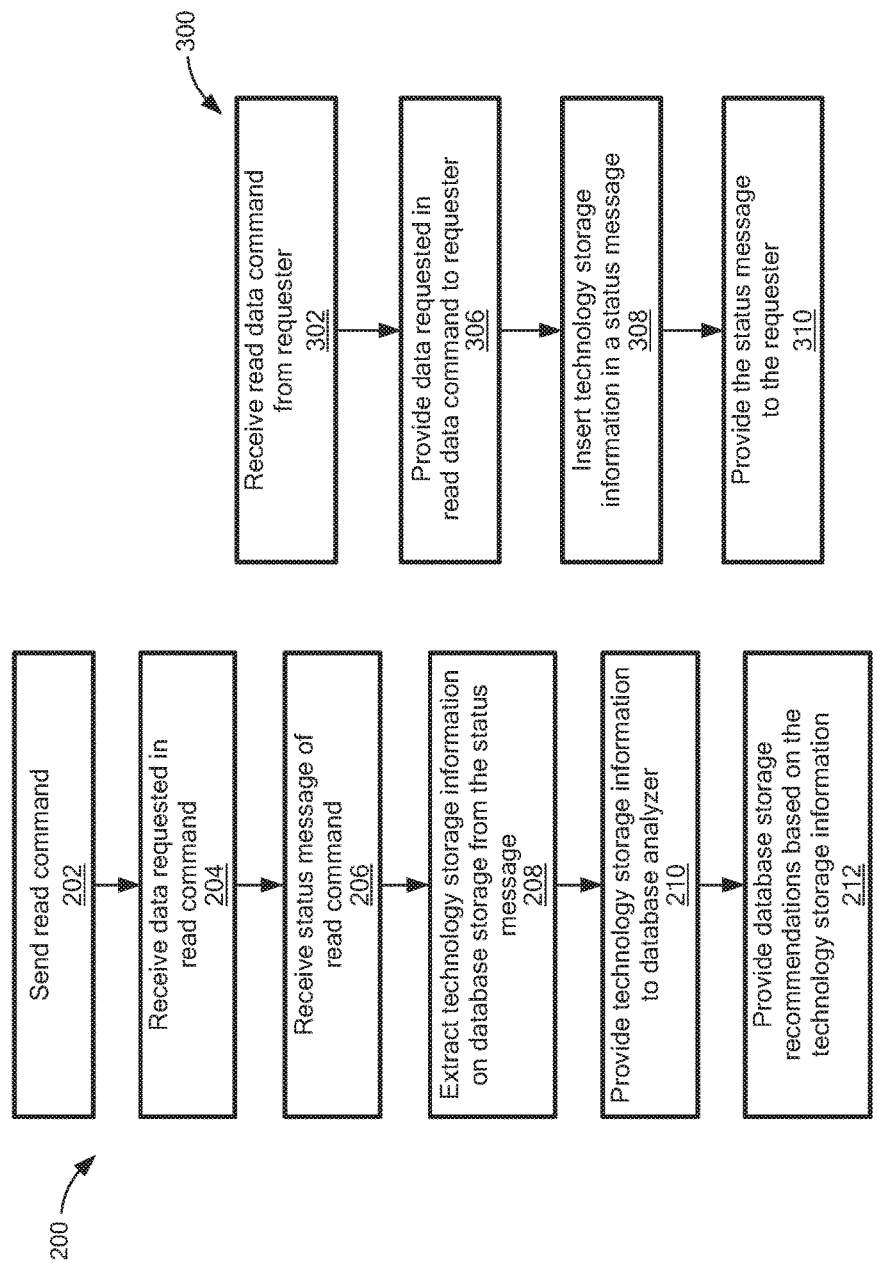

PROVIDING STORAGE TECHNOLOGY INFORMATION TO IMPROVE DATABASE PERFORMANCE

RELATED PATENT APPLICATIONS

This patent application claims priority to Indian Patent Application Number 6639/CHE/2015, filed Dec. 11, 2015, and entitled "PROVIDING STORAGE TECHNOLOGY INFORMATION TO IMPROVE DATABASE PERFORMANCE," which is incorporated herein by reference in its entirety.

BACKGROUND

Computer data is vital to today's organizations and a significant part of protection against disasters is focused on data protection. Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes receiving a read or write command from a requester to read data from or write data to a database, inserting in a status message on a status of the read or write command an identifier to identify technology of storage for the data and providing the status message associated with the read or write command to the requester.

In another aspect, an apparatus includes electronic hardware circuitry configured to receive a read or write command from a requester to read data from or write data to a database, insert in a status message on a status of the read or write command an identifier to identify technology of storage for the data and provide the status message associated with the read or write command to the requester.

In a further aspect, an article includes a non-transitory computer-readable medium that stores computer-executable instructions. The instructions cause a machine to receive a read or write command from a requester to read data from or write data to a database, insert in a status message on a status of the read or write command an identifier to identify technology of storage for the data and provide the status message associated with the read or write command to the requester.

BRIEF DESCRIPTION OF THE DRAWINGS

FIG. 2 is a flowchart of an example of a process to provide database storage recommendations using storage technology information of the storage where the data in the database is stored.

FIG. 3 is a flowchart of an example of a process to provide storage technology information of the storage where the data in the database is stored.

DETAILED DESCRIPTION

Described herein are techniques to provide storage technology information of the storage where the data in the database is stored to improve database performance.

The following definitions may be useful in understanding the specification and claims.

HOST—at least one computer or networks of computers that runs at least one data processing application that issues I/O requests to one or more storage systems;

I/O REQUEST—an input/output request (sometimes referred to as an I/O), which may be a read I/O request (sometimes referred to as a read request or a read) or a write I/O request (sometimes referred to as a write request or a write);

READ COMMAND—a read request to read data (a read I/O request); and

WRITE COMMAND—a write request to write data (a write I/O request).

Figure 1:
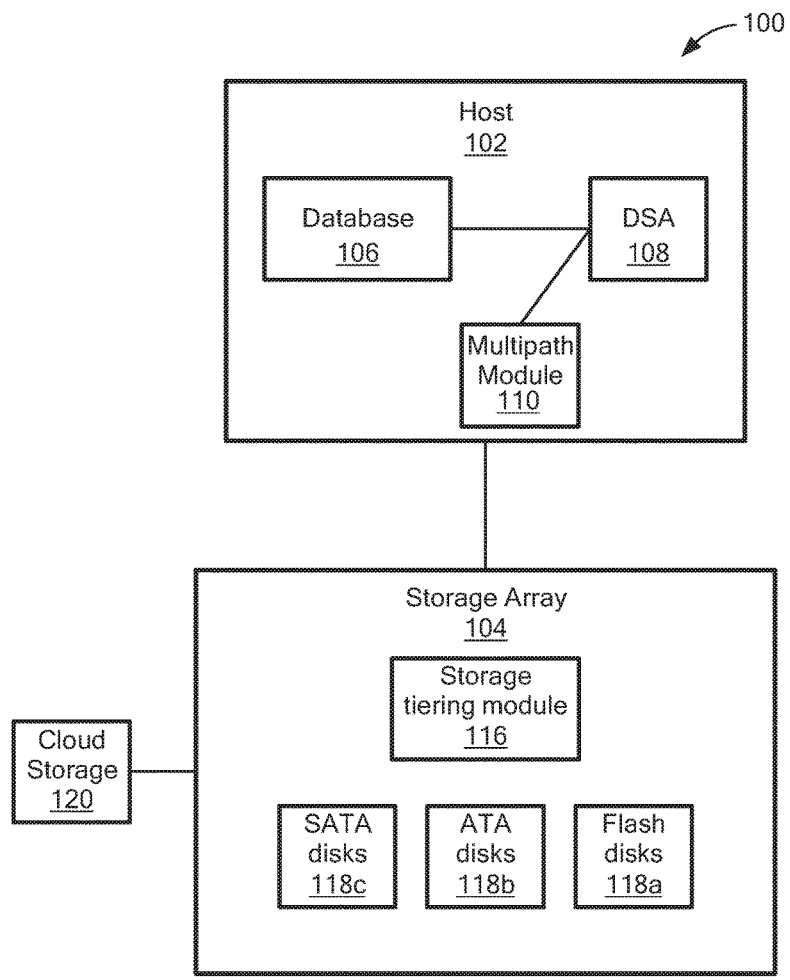
FIG. 1 is a block diagram of an example of a system to provide storage technology information associated with data in a database.

Referring to FIG. 1, a system 100 is an example of a system to provide storage technology information of data in a database. The system 100 includes a host 102 and an array 104. The host 102 includes a database 106, a multipath module 110 and a database storage analyzer (DSA) 108. In one example, the DSA 108 monitors and collects data from both the database 106 and the storage array 104 and correlates the data to identify latency issues and other performance issues and makes recommendations on how to correct these issues. In one particular example, the DSA 108 identifies when reports will be generated and what portions of the database are needed to be readily available to support the report. As will be described further herein, the DSA 108 will receive storage technology information to make better recommendations than previous DSAs. In one example, the DSA 108 is an EMC® Database Storage Analyzer.

In one example, the multipath module 110 is used by the host 102 to request information from the storage array 104. In one example, a multipath module 110 includes the features of EMC® POWERPATH®.

The storage array 104 includes a storage tiering module 116, flash disks 118a, ATA (Advanced Technology Attachment or AT Attachment) disks 118b and SATA (serial ATA) disks 118c. When comparing the disks 118a-118c, the flash disks 118a are more expensive but provide faster data retrieval (e.g., 1 million I/Os (input/output requests) per second) than ATA disks 118b while the ATA disks 118a are more expensive but provide faster data retrieval than the SATA disks 118c (e.g., 100 per second). The storage array 104 may be connected to cloud-based storage 120, which provides slower data retrieval compared to the disks 118a-118c.

For example, the storage tiering module 116 determines how often portions of the database are accessed (e.g., by read commands) and determines an appropriate location where the data is to be saved in the storage array 104. While storing all data in flash disks would be preferred it is not economically practical because of the expense of flash disks. The storage tiering module 116 stores portions of database in a tiering arrangement. For example, data from locations in the database 106 that are accessed very often (sometimes called "hot regions") are stored in the flash disks 118*a* while data from locations in the database 106 that are accessed infrequently (sometimes called "cold regions") would be saved in the SATA disks 118*c*. Data from locations in the database 106 that are accessed less often than warm regions but more frequently than cold regions (sometimes called "warm regions") would be saved in the ATA disks 118*b*. Data in the database 106 that is accessed less than cold regions may be save in the cloud storage 120. In one example, the storage tiering module 116 is an EMC® Fully Automated Storage Tiering (FAST™).

Over time, the storage tiering module 116 may move data from storage disks of one technology to storage disks of another technology without every notifying the DSA 108. Thus, the DSA 108 does not have an accurate or realistic information as to where the data in the database 106 is stored and what storage technology the data is stored on. This can lead to the DSA 108 making inaccurate recommendations. For example, a monthly report is due in two days and the DSA 108 was last informed that the data is stored in flash disks 118*a* when actually the data was move to SATA disks 118*c* by the storage tiering module 116. Since the SATA disks 118*c* are much slower than flash disks 118*a*, the DSA 108 should have made a recommendation to move the data from SATA disks 118*c* to the flash disks 118*a* days earlier.

As will be further described herein, the storage array 104 has been configured to provide feedback to the DSA 108 so that the DSA 108 may have a better information on what storage technology the data is actually stored on. For example, when the DSA 108 knows (from the database 106 work performed) that some data is "old" then the DSA 108 will instruct the storage array 104 to move the old data to slower storage disks. This will save the storage array 104 a significant amount of statistical collection and processing time to perform itself.

Referring to FIG. 2, a process 200 is an example of a process to provide database storage recommendations using storage technology information of the storage where the data in the database is stored. The process 200 sends a read command to a storage array (202). For example, the host 102 sends a read command to the storage array 104 to read data stored in the storage array 104 from the database 106. In one example, the read command is an input/output request (I/O).

The process 200 receives the data requested in the read command from the storage array (204). For example, the storage array 104 retrieves the data identified in the read command and sends it to the host 102. In one example, the data may be retrieved from the disks 118*a*-118*c* or the cloud network 120.

The process 200 receives a status message of the read command from the storage array (206). For example, the storage array 104 sends the status message to the host 102. In one example, the status message indicates the status of the read command (e.g., whether the read was successful or not). In one example, the status message is a SCSI (Small Computer System Interface) message.

The process 200 extract storage technology information from the status message (208). For example, a storage technology identifier is in the status message indicating the type of storage where the data requested from the read command is stored. For example, the identifier identifies whether the data was stored in a flash disk, an ATA disk, a SATA disk, a cloud network and so forth. In one particular example, the host 102 extracts the storage technology information.

The process 200 provides the storage technology information to a database analyzer (210). For example, the host 102 provides the storage technology information to the DSA 108.

The process 200 provides a database storage recommendation based on the storage technology information (212). For example, the DSA 108 provides storage recommendations to the storage tiering module 116.

Referring to FIG. 3, a process 300 is an example of a process to provide storage technology information of the storage where the data in the database is stored.

The process 300 receives a read data command from a requester (302). For example, the host 102 using the multipath module 110 sends a read data command to the storage array 104.

The process 300 provides the data requested in the read data command to the requester (306). For example, the data from the storage array 104 is provided to the host 104 using the multipath module 110.

The process 300 inserts storage technology information in a status message (308). For example, a storage technology identifier is places in a status message. In one particular example, a storage identifier of "1" represents flash disks 118*a*, "2" represents ATA disks 118*b*, "3" represents SATA disks 118*c*, "4" represents cloud storage and so forth. As one of ordinary skill in the art would recognize, the types and number of storage technology storage identifiers are not limited to those described herein.

The process 300 provides the status message to the requester (310). For example, the status message 102 is provided to the host 102 using the multipath module 110.

Figure 4:
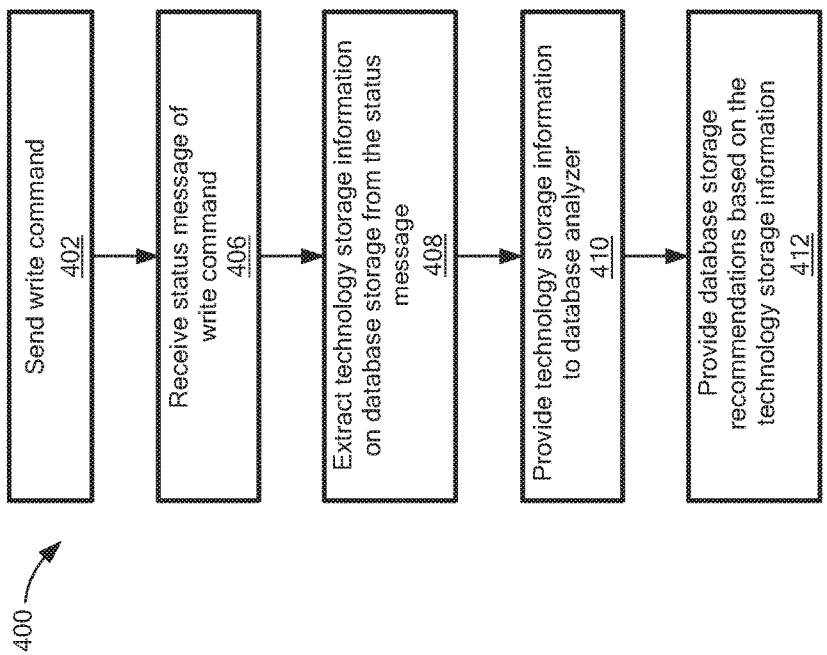
FIG. 4 is a flowchart of another example of a process to provide database storage recommendations using storage technology information of the storage where the data in the database is stored.

Referring to FIG. 4, a process 400 is another example of a process to provide database storage recommendations using storage technology information of the storage where the data in the database is stored. The process 400 sends a write command to a storage array (402). For example, the host 102 sends a write command to the storage array 104 to write data to the storage array 104 from the database 106. In one example, the write command is an input/output request (I/O).

The process 400 receives a status message of the write command from the storage array (406). For example, the storage array 104 sends the status message to the host 102. In one example, the status message indicates the status of the write command (e.g., whether the write was successful or not). In one example, the status message is a SCSI (Small Computer System Interface) message.

The process 400 extract storage technology information from the status message (408). For example, a storage technology identifier is in the status message indicating the type of storage where the data requested from the read command is stored. For example, the identifier identifies whether the data was stored in a flash disk, an ATA disk, a SATA disk, a cloud network and so forth. In one particular example, the host 102 extracts the storage technology information.

The process 400 provides the storage technology information to a database analyzer (410). For example, the host 102 provides the storage technology information to the DSA 108.

The process 400 provides a database storage recommendation based on the storage technology information (412).

For example, the DSA 108 provides storage recommendations to the storage tiering module 116.

Figure 5:
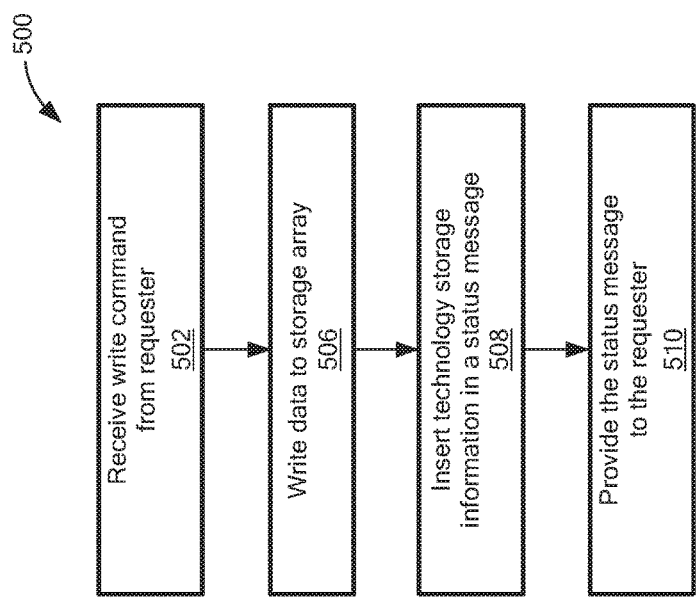
FIG. 5 is a flowchart of another example of a process to provide storage technology information of the storage where the data in the database is stored.

Referring to FIG. 5, a process 500 is another example of a process to provide storage technology information of the storage where the data in the database is stored.

The process 500 receives a write command from a requester (502). For example, the host 102 sends a request to write data to the storage array 104.

The process 500 writes the data to the storage array (506). For example, the data from the write command is written to the storage array 104.

The process 500 inserts storage technology information in a status message (508). For example, a storage technology identifier is places in a status message. In one particular example, a storage identifier of "1" represents flash disks 118a, "2" represents ATA disks 118b, "3" represents SATA disks 118c, "4" represents cloud storage and so forth. As one of ordinary skill in the art would recognize, the types and number of storage technology storage identifiers are not limited to those described herein.

The process 500 provides the status message to the requester (510). For example, the status message 102 is provided to the host 102.

Figure 6:
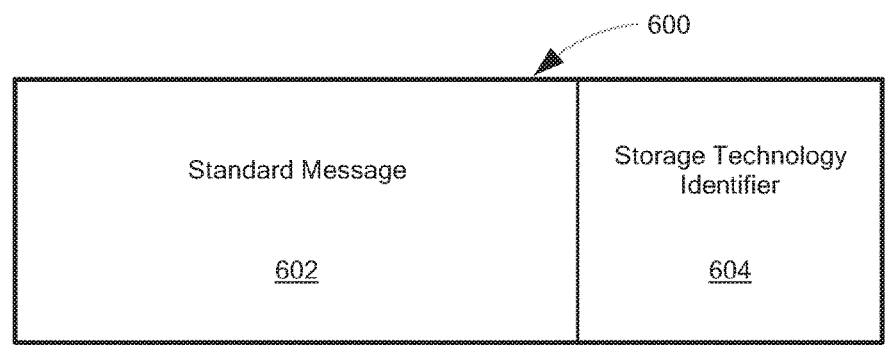
FIG. 6 is a diagram of an example of a status message for a read request comprising storage technology information of the storage where the data in the database is stored.

Referring to FIG. 6, a status message 600 is an example of a status message. The status message 600 includes a standard message portion 602 and a storage technology identifier 604. For example, the standard message portion 602 includes information that indicates whether the command (read or write command) was successful. In one particular example, the storage technology identifier 604 occupies 1 byte. While FIG. 6 suggest that a storage technology identifier 605 may be located at the end of the storage message 600, one of ordinary skill in the art would recognize that the storage technology identifier 604 may be located anywhere within the message 600. For example, the storage technology identifier 604 may be located in unused portions of the standard message portion.

Figure 7:
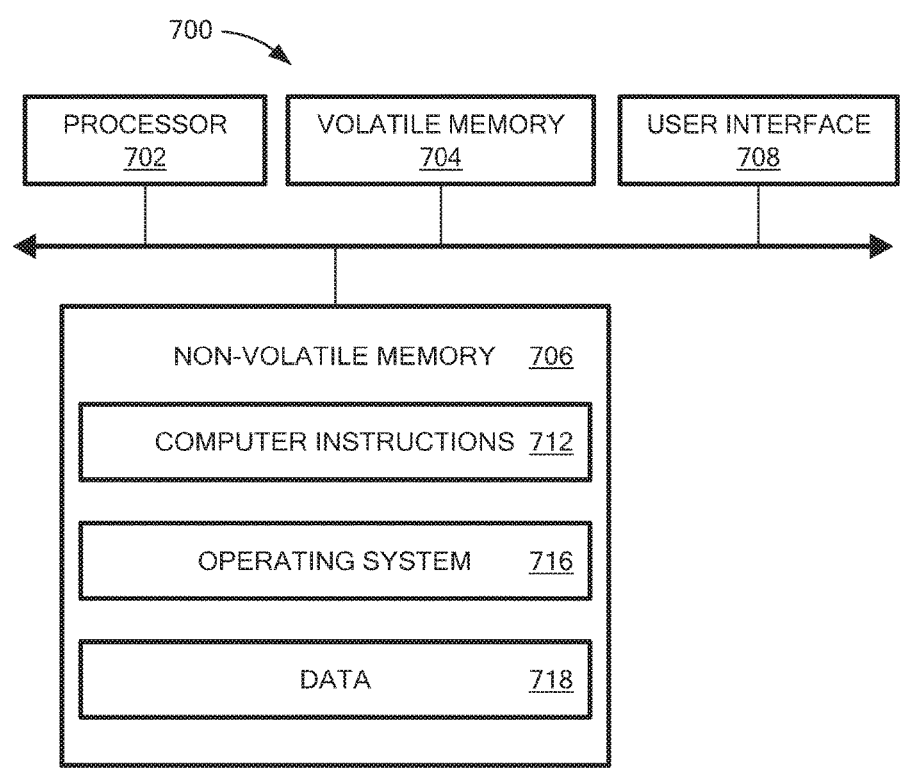
FIG. 7 is a block diagram of an example of a computer on which any of the processes of FIGS. 2 to 5 may be implemented.

Referring to FIG. 7, in one example, a computer 700 includes a processor 702, a volatile memory 704, a non-volatile memory 706 (e.g., hard disk) and the user interface (UI) 708 (e.g., a graphical user interface, a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., processes 200, 300, 400 and 500).

The processes described herein (e.g., processes 200, 300, 400 and 500) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200, 300, 400 and 500 are not limited to the specific processing order of FIGS. 2 to 5. Rather, any of the processing blocks of FIGS. 2 to 5 may be re-ordered, combined or removed, performed in parallel or in serial, as necessary, to achieve the results set forth above.

The processing blocks (for example, in the processes 200, 300, 400 and 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method for storing data on a device comprising:
   receiving a read or write command from a requester to read data from or write data to, respectively, a database;
   inserting in a status message associated with the read or write command an identifier identifying a type of storage technology used for storing the data, the status message indicating whether the read or write command was successful, the identifier identifying a type of connection interface that is used by a storage device on which the data is stored;
   providing the status message associated with the read or write command to the requester;
   extracting storage technology information from the status message where the data is located;

providing the storage technology information to a database analyzer;
receiving a data storage recommendation from the database analyzer in response to providing the storage technology information; and
storing data from the database on a type of storage technology based upon the storage recommendation.

2. The method of claim 1, wherein providing the data storage recommendation using the database analyzer comprises sending the recommendation to a storage tiering module on the storage array.

3. The method of claim 1, wherein the identifier indicates whether the storage device used for storing the data includes at least one of a flash disk, an ATA disk, a SATA disk or a cloud storage.

4. The method of claim 1, wherein receiving the read or write command from the requester comprises receiving a read or write command from a requester to read data from or write data to a storage array.

5. An apparatus for storing data on a device, comprising:
electronic hardware circuitry configured to:
receive a read or write command from a requester to read data from or write data to a database;
insert in a status message on a status of the read or write command an identifier to identifying a type of storage technology used for storing the data, the status message indicating whether the read or write command was successful, the identifier identifying a type of connection interface that is used by a storage device on which the data is stored;
provide the status message associated with the read or write command to the requester;
extract storage technology information from the status message;
provide the storage technology information to a database analyzer;
receive a data storage recommendation from the database analyzer in response to providing the storage technology information; and
store data from the database on a type of storage technology based upon the storage recommendation.

6. The apparatus of claim 5, wherein the circuitry comprises at least one of a processor, a memory, a programmable logic device or a logic gate.

7. The apparatus of claim 5, further comprising circuitry configured to:
send the read or write command to the database stored in a storage array;
receive the status message; and
extract storage technology information from the status message where the data is located.

8. The apparatus of claim 7, further comprising circuitry configured to:
provide the storage technology information to a database analyzer; and
provide a data storage recommendation using the database analyzer based on the storage technology information.

9. The apparatus of claim 8, wherein the circuitry configured to provide the data storage recommendation using the database analyzer comprises circuitry configured to send the recommendation to a storage tiering module on the storage array.

10. The apparatus of claim 5, wherein the identifier indicates whether the storage device used for storing the data includes at least one of a flash disk, an ATA disk, a SATA disk or a cloud storage.

11. The apparatus of claim 5, wherein circuitry configured to receive the read or write command from the requester comprises circuitry configured to receive a read or write command from a requester to read data from or write data to a storage array.

12. An article for storing data on a device comprising:
a non-transitory computer-readable medium that stores computer-executable instructions, the instructions causing a machine to:
receive a read or write command from a requester to read data from or write data to a database;
insert in a status message on a status of the read or write command an identifier identifying a type of a storage technology used for storing the data, the status message indicating whether the read or write command was successful, the identifier identifying a type of connection interface that is used by a storage device on which the data is stored; and
provide the status message associated with the read or write command to the requester;
extract storage technology information from the status message;
provide the storage technology information to a database analyzer;
receive a data storage recommendation from the database analyzer in response to providing the storage technology information; and
store data from the database on a type of storage technology based upon the storage recommendation.

13. The article of claim 12, wherein the instructions causing the machine to provide the data storage recommendation using the database analyzer comprises instructions causing the machine to send the recommendation to a storage tiering module on the storage array.

14. The article of claim 12, wherein the identifier indicates whether the storage device used for storing the data includes at least one of a flash disk, an ATA disk, a SATA disk a cloud storage.

15. The article of claim 12, wherein instructions causing the machine to receive the read or write command from the requester comprises instructions causing the machine to receive a read or write command from a requester to read data from or write data to a storage array.

* * * * *